United States Patent [19]
Buff, IV

[11] Patent Number: 5,823,288
[45] Date of Patent: Oct. 20, 1998

[54] CONTROLLABLE SLIDE CAR

[76] Inventor: William J. Buff, IV, 131 Shore Dr., Long Branch, N.J. 07740

[21] Appl. No.: 757,392

[22] Filed: Nov. 27, 1996

[51] Int. Cl.[6] .................................................. B62D 63/00
[52] U.S. Cl. ........................ 180/445; 180/437; 180/417; 180/413
[58] Field of Search .................................. 180/445, 412, 180/408, 410, 411, 413, 417, 419, 434, 435, 436, 437, 443, 444, 447, 2.1; 446/454, 460

[56] References Cited

U.S. PATENT DOCUMENTS

| | | | |
|---|---|---|---|
| 4,449,727 | 5/1984 | Roos | 280/91 |
| 4,700,798 | 10/1987 | Johansson et al. | 180/209 |
| 4,967,859 | 11/1990 | Tomlinson | 180/79.1 |
| 4,998,594 | 3/1991 | Orloski | 180/198 |
| 5,626,362 | 5/1997 | Mottola | 280/767 |

*Primary Examiner*—Kevin Hurley
*Assistant Examiner*—Gary Savitt
*Attorney, Agent, or Firm*—Thomason and Moser

[57] ABSTRACT

A controllable slide car for controllably simulating oversteer and understeer conditions in a moving automobile. The controllable slide car comprises a rear steering linkage assembly that attaches to the rear wheel mounting assemblies of an automobile and a controller for controllably steering the rear steering linkage assembly. The controller is powered by the battery of the automobile and manually controlled by a control unit to steer the rear wheel mounting assemblies.

11 Claims, 4 Drawing Sheets

CONTROLLABLE SLIDE CAR

BACKGROUND OF THE DISCLOSURE

1. Field of the Invention

The invention relates to a controllable slide car. More specifically, the invention relates to a slide car that mounts on the rear wheels of a vehicle to controllably simulate oversteer and understeer skidding conditions.

2. Description of the Background Art

A conventional automobile has a steering mechanism controlling the front wheels of the vehicle. To provide better driver control, the front and rear suspensions have different suspension sub-systems. Even with advances in steering mechanisms, braking systems, and suspension sub-systems, oversteer and understeer still account for many accidents and automobile related deaths.

Oversteer and understeer skidding conditions occur when a driver applies too much steering and braking force, or too much power and too much steering force. The result in both cases is due to excessive weight transfer to the tires, which, in turn, unevenly puts too much pressure on the tires. When the pressures and forces are greater than the adhesion force between the tires and road, the vehicle goes out of control. A wet or icy road surface further lowers the limit of adhesion between the tires and the road and can cause an out-of-control situation at a much lower force.

Understeer, or "pushing", happens when the front tires have less traction than the rear tires. Usually, the shifting of the vehicle's weight onto the front tires, i.e., by taking your foot off the gas or applying the brakes, regains control. Typically, overcompensating for the understeering results in oversteering. Oversteer or "fish-tailing", the opposite of understeer, happens when the rear tires have less traction then the front tires. Usually, the shifting of the vehicle's weight onto the rear wheels, i.e., by accelerating the vehicle and/or turning the front wheels in the direction the rear wheels are attempting to move, regains control of the automobile.

Thus, the interrelationship between the front end, rear end, and the center of gravity of the vehicle is the cause of understeer and oversteer. Other factors that can decrease the likelihood of understeer and oversteer are tire design, road condition, suspension sub-systems, vehicle speed, turning force, and vertical force placed on the tires, and the like. Although these factors can improve the adhesion force between the tire and the road, large lateral movements, resulting in out of control skidding, can still occur. Devices that simulate understeer and oversteer conditions when used to train and improve a driver's skill and response to handling such conditions, i.e., improving a driver's ability to regain control of an out-of-control automobile, can significantly prevent accidents.

A conventional device used to train drivers uses centrifugal forces to simulate oversteer conditions in the vehicle. Another device also uses centrifugal forces and a series of dollies and outriggers to simulate both understeer and oversteer conditions. However, the latter design only works on road surfaces that are ideally level. Also, since both designs work off of centrifugal forces, the skidding conditions can only be simulated at a vehicular speed of greater than 20–30 miles per hour.

Therefore, a need exist in the art for a controllable slide car that accurately and controllably simulates oversteering and understeering conditions in vehicles at any speed.

SUMMARY OF THE INVENTION

The disadvantages heretofore associated with the prior art are overcome by an apparatus, a controllable slide car, for controllably simulating oversteer and understeer conditions in a moving automobile. Specifically, the controllable slide car of the present invention comprises a rear steering linkage assembly and a controller that attaches to the rear wheel mounting assemblies of an automobile. In effect, the invention selectively "steers" the rear wheels to produce "sliding" of the automobile. Through operator manipulation of a control unit, the controller facilitates steering of the rear steering linkage assembly.

More specifically, the controller is powered by the battery of the automobile via a control unit. The control unit contains an operator interface such as a joystick through which the operator "steers" the rear wheels of the automobile. As such, oversteer and understeer conditions can be simulated in a moving automobile when the joystick is moved in a particular direction. For example, when the joystick is moved in the same direction as the turning front wheels (i.e., joystick moved to the left during a left-hand turn), the automobile simulates an understeer condition. Likewise, when the joystick is moved in the opposite direction with respect to the turned front wheels, the automobile simulates an oversteer condition. When the joystick remains in a middle position, i.e., neutral position, the controller remains in a neutral position that produces a straight rear tire alignment.

As a result of using the invention installed on an automobile, the automobile can be safely, accurately and controllably placed in an oversteer and understeer condition at any speed.

BRIEF DESCRIPTION OF THE DRAWINGS

The teachings of the present invention can be readily understood by considering the following detailed description in conjunction with accompanying drawings in which.

To facilitate understanding, identical reference numerals have been used, where possible, to designate identical elements that are common to the figures.

DETAILED DESCRIPTION

Figure 1:
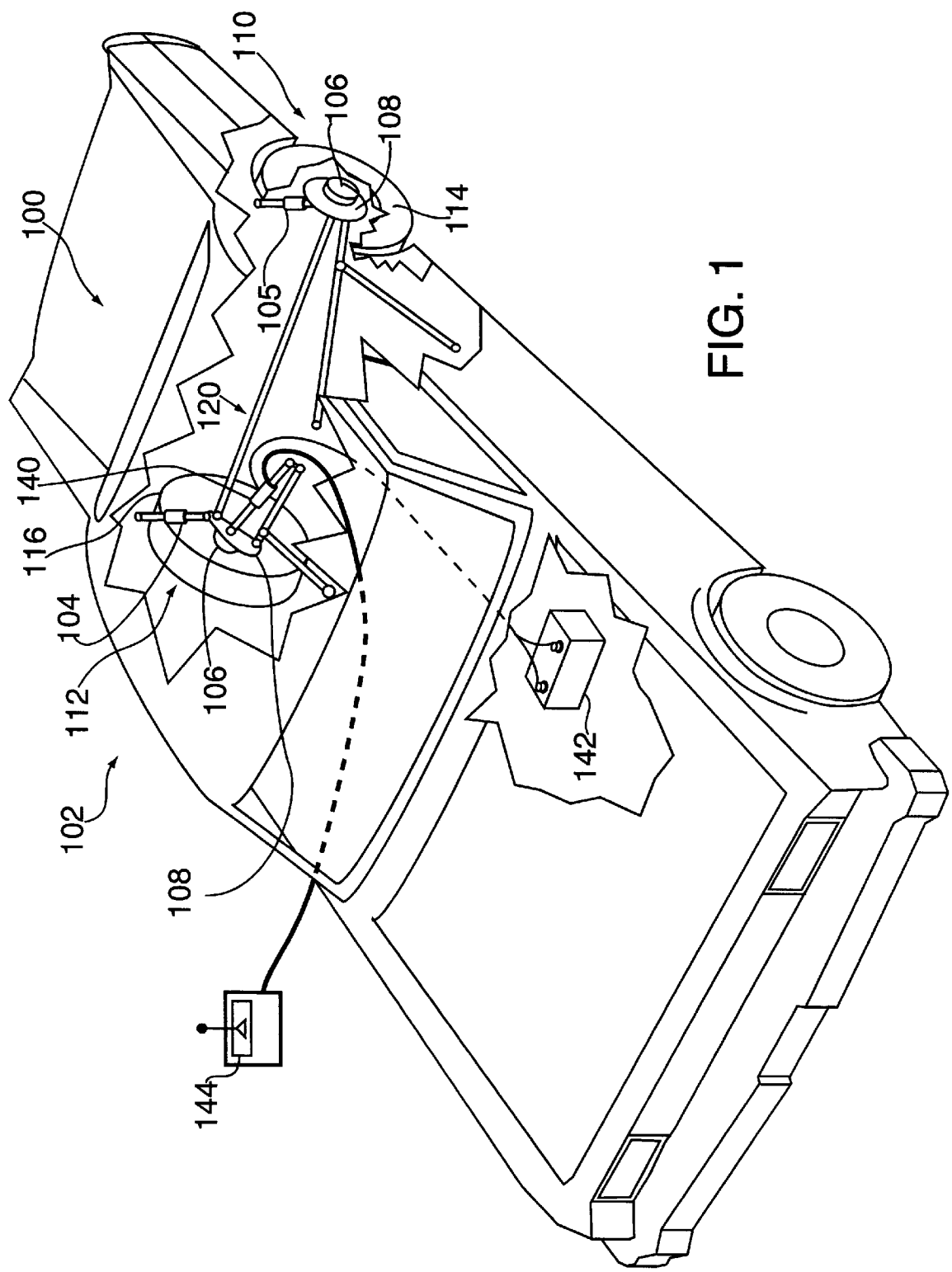
FIG. 1 depicts a perspective view of an automobile including a first embodiment of the controllable slide car of the present invention.

FIG. 1 depicts a perspective view of an automobile 102 including the controllable slide car 100 of the present invention. The controllable slide car 100 of the present invention comprises the rear steering linkage assembly 120 and a controller 140 for controllably steering the rear steering linkage assembly 120. In a first embodiment of the invention, the controllable slide car 100 is installed on an automobile 102 having independent suspension for each rear wheel mounting assembly 108, e.g., a rotor and hub assembly. Further, the relevant components of the automobile include a pair of shock absorbers 104 and 105, rear wheels 110 and 112, rear tires 114 and 116, and a battery 142. The controllable slide car is affixed to the underside frame or unibody of the automobile as well as to the shock absorbers and the wheel mounting assemblies.

Figure 2:
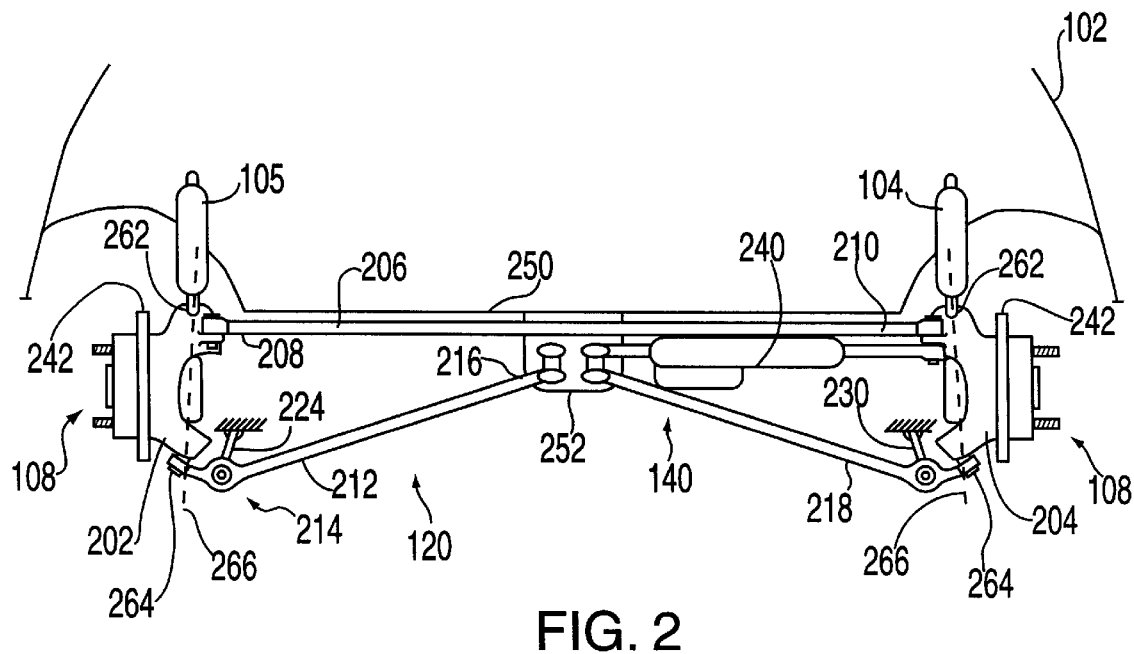
FIG. 2 depicts a rear view of the controllable slide car of FIG. 1.
Figure 3:
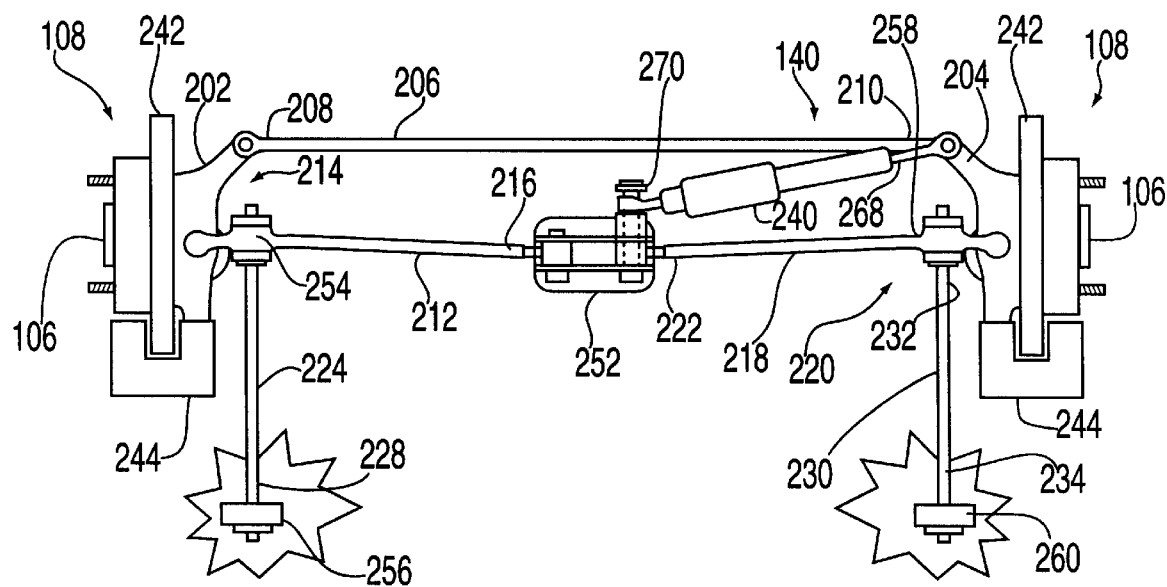
FIG. 3 depicts a bottom view of the controllable slide car of FIG. 1.

FIG. 2 depicts a rear view of the controllable slide car 100 installed in the automobile of FIG. 1. FIG. 3 depicts a bottom view of the controllable slide car 100 installed in the automobile of FIG. 1. For the best understanding of the invention, the reader should simultaneously refer to FIGS. 2 and 3 while reading the following disclosure.

Specifically, the rear steering linkage assembly 120 is affixed to the frame or unibody 250 of the automobile 102 at bracket 252, to the shock absorbers 104 and 105 and to the wheel mounting assemblies 108. Specifically, the assembly attaches to the backing plates 202 and 204 of the wheel mounting assemblies 108. The rear steering linkage assembly 120 contains a tie rod 206, control arms 212 and 218, and torsion bars 224 and 230. The controller 140 contains an electrical ram subsystem 240 and a control unit (144 in FIG. 1). The control unit contains circuitry that applies voltage to the electrical ram subsystem via manipulation of an input device such as a joystick, rheostat, potentiometer, push buttons and the like. For ease of use, the input device is preferably a joystick.

Each of the wheel mounting assemblies 108 conventionally contains a backing plate 202 and 204, disk brake rotor 242, disk brake calipers 244 and a spindle 106. The shock absorbers 104 and 105 are respectively bolted to the backing plates 202 and 204. The left control arm 212 is attached (bolted) to the left backing plate 202 at the first end 214, and to the bracket 252 at the second end 216 of the left control arm 212. Similarly, the right control arm 218 is attached (bolted) to the right backing plate 204 at the first end 220, and to the bracket 252 at the second end 222 of the right control arm 218. To attach ends 216 and 222 of the control arms 212 and 218 to the unibody or the automobile, the bracket 252 contains a pair of spaced apart flanges between which tie eyes at each end of the control arms are positioned. A bolt is extended through the flanges and tie eyes to affix the control arms to the automobile.

The left torsion bar 224 is attached to the left control arm 212 via a tie eye 254 proximate end 214 of control arm 212, and to a body bracket 256 at the second end 228 of the left torsion bar 224. To reduce noise, a rubber bushing circumscribes the torsion bar at the attachment ends, i.e., within the tie eye and the body bracket. The right torsion bar 230 is attached at ends 232 and 234, in a similar manner to the right control arm 218, i.e., using tie eye 258 and body bracket 260. This assembly of components allows for the rear wheel mounting assemblies 108 to pivot along an axis 266 connecting the shock absorber attachment point 262 to the control arm attachment point 264 on the backing plate.

The tie rod 206, having tie eyes at both ends 208 and 210, is attached by bolting the tie eyes to the backing plates 202 and 204. The tie rod is connected to each backing plate at a location that is off the pivot axis 266 such that movement of one backing plate 202 similarly moves the other backing plate 204. Thus, the pair of wheel mounting assemblies "steers" in unison.

The controller 140 for controllably steering the rear steering linkage assembly 120 has an electrical ram subsystem 240, having an electric motor that is powered by the battery 142 (shown in FIG. 1). The electrical ram subsystem is comprised of an actuator and an actuator shaft. Warner Electric's DC Linear Actuator having a twelve inch stroke (model number DL12-10B5-12) can be used as the electrical ram sub-system 240. In this model of controller, the actuator, a ball bearing screw worm gear, can sustain a load of 1000 pounds. The actuator shaft of the electrical ram subsystem has a tie eye at a distal end 268 bolted to the right backing plate 204 at a location off the wheel mounting assembly pivot axis, e.g., bolted to the point where the tie rod attaches to the backing plate. The stationary end 270 of the electrical ram subsystem is bolted to the bracket 252 proximate the first end 222 of the left control arm 218.

In use, tires, smaller than tires fitted by the manufacturer for the particular automobile, are mounted to the wheel mounting assemblies 108. The tires are preferably smaller because the standard sized wheel supplied by the manufacturer would impact the side of the wheel well of the automobile when the invention steers the rear wheels. The wheels are sized to avoid such impact. Additionally, the shock absorbers 104 and 105 used are similar to front end suspension type shock absorbers, to further ensure proper clearance between the rear tires and the wheel well. Also, front suspension type shock absorbers allow the slide car to freely pivot since such shock absorbers are usually attached by a single bolt at a single place; whereas, common rear suspension type shock absorbers would restrict the slide car pivot action because they are usually attached with three bolts at three separate places.

When the joystick of the control unit 144, or other input device, is moved to a left position, the electrical ram subsystem 240 is activated and the actuator drives the worm gear to extend the actuator shaft 268, forcing the backing plate 204 to turn its associated wheel (112 in FIG. 1). When the joystick is moved to a right position, the actuator shaft 268 retracts and pulls the backing plate 204 to turn the wheel 112 in the other direction. The left rear wheel 110 turns synchronously with the right rear wheel 112 because the tie rod 206 forces the left wheel to pivot in unison with the right wheel. When the joystick is in the middle, neutral position, the actuator remains in a neutral position that maintains a straight rear tire alignment.

An oversteer and understeer condition is achieved when the driver of the automobile steers the automobile while moving, and the joystick is manipulated. To produce an oversteer condition, the joystick is moved opposite the direction of the steering automobile. Likewise, to produce an understeer condition, the joystick is moved in the direction of the steering automobile.

Figure 4:
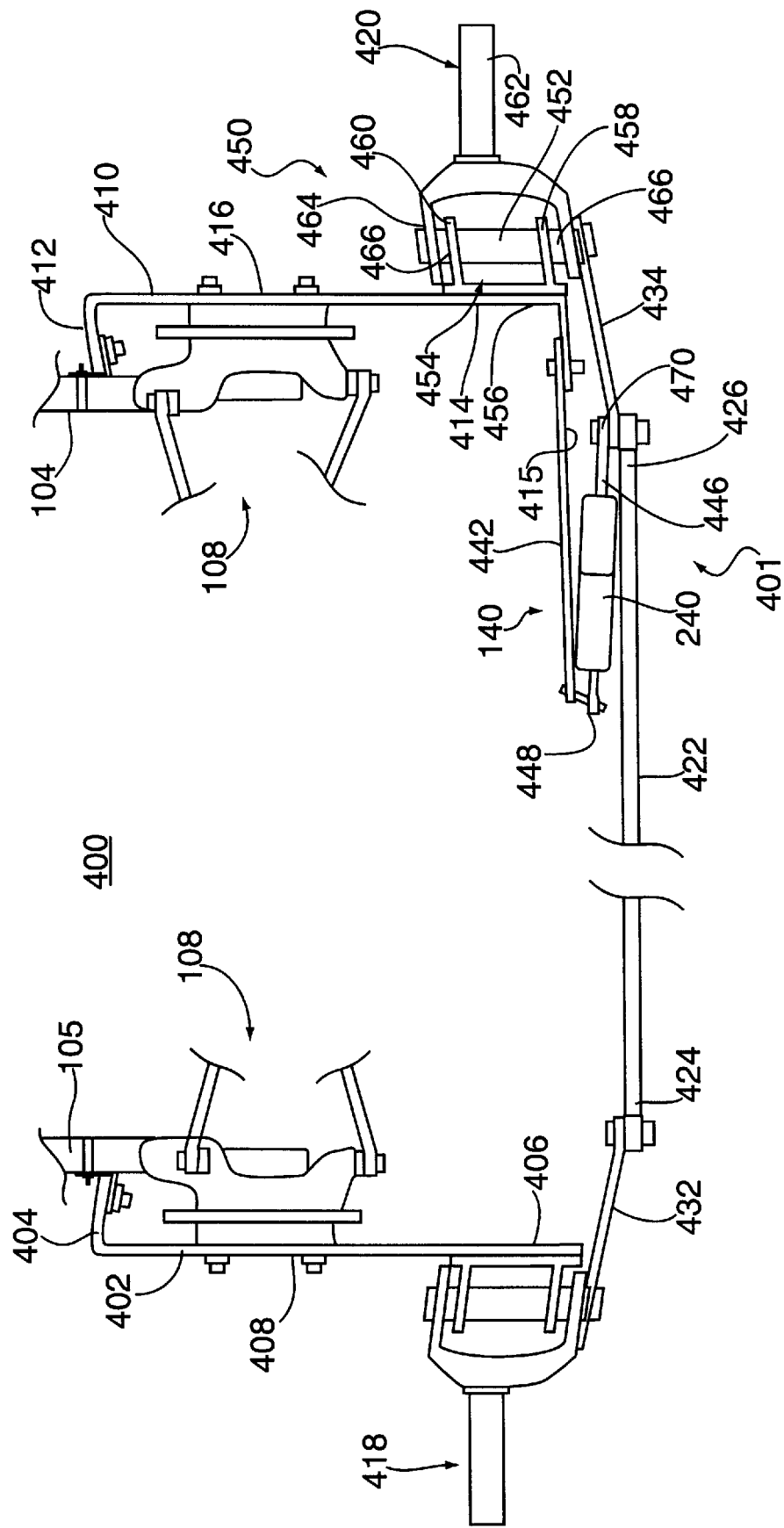
FIG. 4 depicts rear view of an alternative embodiment of the present invention.
Figure 5:
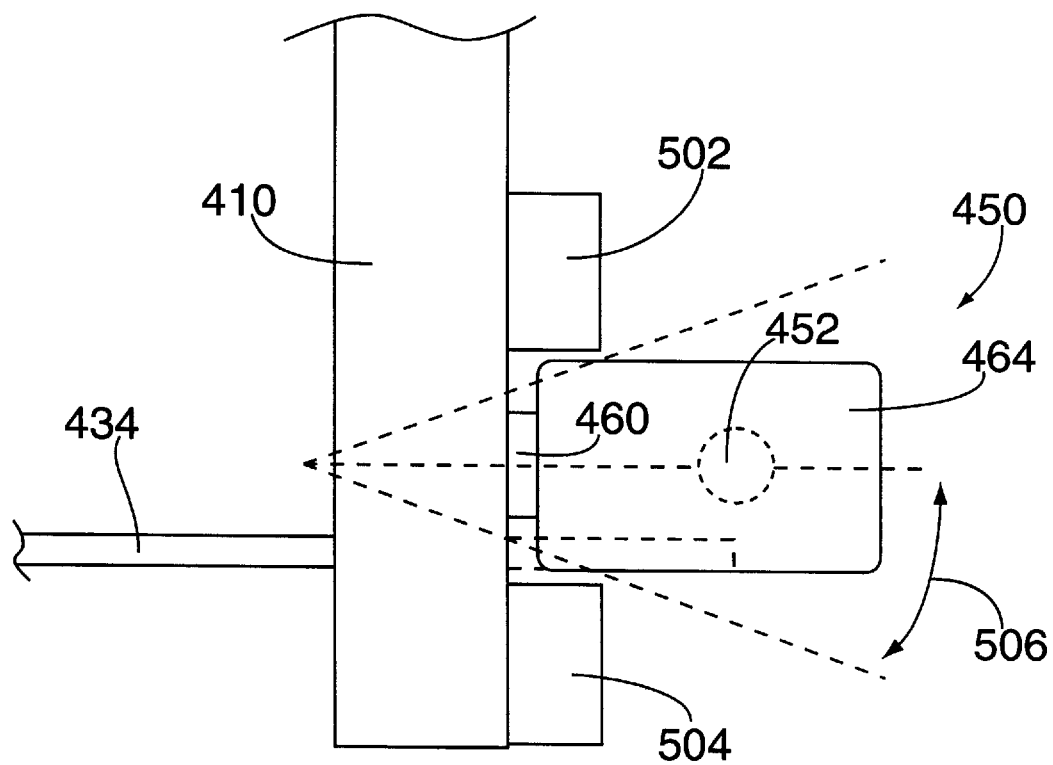
FIG. 5 depicts a bottom view of a portion of the alternative embodiment of the present invention of FIG. 4.

FIG. 4 depicts a second embodiment 400 of the present invention having a rear steering linkage assembly 401 and controller 140 that is portable and adjustable. The portable slide car 400 simply attaches to the rear wheel mounting assemblies as well as a pair of other anchor points, e.g., the shock absorbers. As such, the portable embodiment can be quickly and easily fitted to most any automobile to provide flexibility in the types of automobiles that can be used to simulate oversteer and understeer.

Specifically, the portable rear linkage steering assembly contains adjustable mounting plates 402 and 410, pivoting spindles 418 and 420, steering arms 432 and 434 and a tie rod 422. The adjustable mounting plates 402 and 410, are mounted by bolting the mid-section 408 and 416 of each respective mounting plate 402 and 410 to each of the rear wheel mounting assemblies 108 of an automobile. To further secure the invention to the automobile, top flanges 404 and 412 of the mounting plates 402 and 410 are respectively clamped to the rear shock absorbers 104 and 105. Of course, rather than utilize the shock absorbers, there are other ways to further secure and anchor the invention to the automobile, e.g., affixing the adjustable mounting plate to the frame or unibody of the automobile and the like.

The pivoting spindles 418 and 420 are welded to the bottom ends 406 and 414 of the mounting plates 402 and 410. To facilitate affixing the spindles to the mounting plates as well as providing a pivotal support, a king pin assembly 450 provides the pivot. Specifically, the king pin assembly contains a king pin 452, a king pin support 454, and a spindle 420. The king pin support 454 is welded to the bottom of the adjustable mounting plate 410. The king pin support contains a plate 456 that is welded to the mounting plate 410 and a pair of spaced apart flanges 458 and 460. The flanges are angled upward slightly. The king pin 452 extends through a bore in the spindle 420 as well as the pair of flanges 458 and 460. The spindle contains an axle 462 coupled to and supported by a Y-shaped section. The spacing between the "ears" 464 of the Y shaped section is wider than the spacing between the spaced apart flanges 460 and 458. Bushings 466 are positioned between the "ears" 464 and the flanges 460 and 458. The king pin 452 pivotally couples the spindle 420 to the support 454. Spindle 418 is similarly coupled to mounting plate 402.

To facilitate controllably steering the spindles 418 and 420 in unison, each spindle is coupled to a respective steering arm 432 and 434. Each steering arm is attached (bolted) to the pivoting spindles 418 and 420, respectively, on the lower "ear" of the spindle. The tie rod 422 is attached, by bolting the ends 424 and 426 to the steering arms 432 and 434.

A controller 140 for controllably steering the rear steering linkage assembly 401 has a ram bracket 442, mounted by bolting to a flange 415 at the bottom 414 of the right adjustable mounting plate 410. An electrical ram subsystem 240, discussed above, is bolted at the stationary end 448 to the ram bracket 442. For this embodiment, the Warner Electric DC Linear Actuator having an eight inch stroke (model number DL12-10B5-08) is used as the electrical ram subsystem 240. The actuator shaft 446 of the electrical ram sub-system has a distal end 470 that is bolted to the right steering arm 434. The steering arm attaches off the pivot axis of the spindle assembly such that linear movement of the actuator shaft 446 is translated into pivotal movement of the spindles 418 and 420.

When the joystick of the control unit 144 is moved to a left position, the electrical ram sub-system 240 is activated and the actuator drives a worm gear to extend the actuator shaft and force the right pivoting spindle 420 to turn the right wheel (not shown). When the joystick is moved to a right position, the actuator shaft retracts and pulls the right slide car pivoting spindle 420 to turn the wheel in the other direction. The left wheel turns synchronously with the right wheel because the tie rod 422 forces the left wheel to pivot whenever the right wheel pivots. Similarly, when the joystick is left in the middle, neutral position, the actuator remains in a neutral position that is set to a straight rear tire alignment.

As shown in FIG. 6, the pivoting spindles can be optionally fitted with mechanical stops 502 and 504. The stops are mounted to the mounting plates 402 and 410 on either side of the king pin assembly 450. These stops prevent the pivoting spindles 418 and 420 from turning, i.e. pivoting, more than 20 degrees left or 20 degrees right 506. This limitation of turning radius is generally a safety feature to ensure that the steering linkage assembly does not become damaged.

In use, trailer tires are fitted to the pivoting spindles. The trailer tires are smaller than standard automobile tires. The trailer tires enable the automobile to retain a level appearance, although the mounting plates extend from the wheel mounting assemblies. The portable slide car has adjustable mounting plates that permit installation of the invention on most automobiles. Installation only requires removing the rear wheels and tires from the automobile and then bolting the adjustable mounting plates to the stock drum of the automobile and to the shock absorbers. Manipulating the joystick to control the portable slide car is the same as discussed above for the first embodiment of the slide car.

In either embodiment, the electrically powered controller 140 for controllably steering the rear steering linkage assembly could be replaced by a hydraulic pump subsystem, or some other actuator subsystem. Accordingly, a hydraulic pump subsystem would contain a steering cylinder, a pump, a control valve, and a feedback sensor. Specifically, the steering cylinder would be connected to the tie rod, the control console electrically coupled to the control valve and to the automobile battery, and the pump connected to and for driving the steering cylinder, would replace the electrical actuator, actuator shaft and worm gear as discussed above in the electrical ram sub-system. The feedback sensor, connected to the tie rod, in combination with the control console and the joystick, would complete the controller for controllably steering the rear steering linkage assembly.

Although various embodiments which incorporate the teachings of the present invention have been shown and described in detail herein, those skilled in the art can readily devise many other varied embodiments that still incorporate those teachings.

What is claimed is:

1. A controllable slide car for controllably simulating understeer and oversteer conditions in an automobile having a rear wheel mounting assembly and conventional wheels, comprising:

a rear steering linkage assembly connected to the rear wheel mounting assembly, where said rear steering linkage assembly operates independently of a conventional wheel steering system that is used to steer the automobile;

a hydraulic or electro-mechanical actuator that is structurally independent of the conventional steering system and that is coupled to said rear steering linkage for controllably manipulating the rear steering linkage;

a controller, coupled to the hydraulic or electro-mechanical actuator for controllably steering the rear steering linkage assembly and the wheel mounting assembly to simulate understeer and oversteer;

whereby movement of the hydraulic or electro-mechanical actuator causes movement of the rear wheel mounting assembly and whereby this movement caused by the hydraulic or electro-mechanical actuator is movement in addition to movement caused by the conventional wheel steering system of the rear wheel mounting assembly;

and whereby the oversteer and understeer are accomplished through movement of the conventional wheels and are accomplished without the use of additional wheels and without replacing any of the conventional wheels.

2. The apparatus of claim 1 wherein the rear wheel mounting assembly comprises a first backing plate of a first rear wheel mounting assembly and a second backing plate of a second rear wheel mounting assembly, and the rear steering linkage assembly comprises:

a tie rod, having a first end connected to the first backing plate and a second end connected to the second backing plate;

a first control arm connected between the first backing plate and a mounting bracket on an underside of the automobile;

a second control arm connected between the second backing plate and said mounting bracket;

a first torsion bar connected between the first control arm and the underside of the automobile; and a second torsion bar connected between the second control arm and the underside of the automobile.

3. The apparatus of claim 1 wherein the hydraulic or electro-mechanical actuator is an electrical ram subsystem, mechanically connected to the automobile and the wheel mounting assembly, and electrically coupled to an automobile battery.

4. The apparatus of claim 1 wherein the hydraulic or electro-mechanical actuator is a hydraulic pump sub-system connected to the automobile and the wheel mounting assembly.

5. An apparatus for controllably simulating understeer and oversteer conditions in an automobile having a rear wheel mounting assembly and conventional wheels, comprising:

a rear steering linkage assembly, removably connected to the rear wheel mounting assembly, having a pair of pivotal spindles, where said rear steering linkage assembly operates independently of a conventional wheel steering system that is used to steer the automobile;

a hydraulic or electro-mechanical actuator that is structurally independent of the conventional steering system and that is coupled to said rear steering linkage for controllably manipulating the rear steering linkage;

a controller, coupled to the hydraulic or electro-mechanical actuator for controllably moving the pivotal spindles and the wheel mounting assembly to simulate understeer and oversteer;

whereby movement of the hydraulic or electro-mechanical actuator causes movement of the rear wheel mounting assembly and whereby this movement caused by the hydraulic or electro-mechanical actuator is movement in addition to movement caused by the conventional wheel steering system of the rear wheel mounting assembly, and whereby the oversteer and understeer are accomplished through movement of the conventional wheels and are accomplished without the use of additional wheels and without replacing any of the conventional wheels.

6. The apparatus of claim 5 wherein the rear steering linkage assembly comprises:

a first mounting plate affixed to a first rear wheel mounting assembly;

a second mounting plate affixed to a second wheel mounting assembly;

a first pivoting spindle attached to the first mounting plate;

a second pivoting spindle attached to the second mounting plate; and a tie rod, having a first end connected to the first pivoting spindle and a second end connected to the second pivoting spindle.

7. The apparatus of claim 6 wherein the first and second mounting plates further comprise means for attaching the rear steering linkage assembly to at least one location on the automobile.

8. The apparatus of claim 7 wherein the first and second mounting plates are adapted to attach to respective shock absorbers.

9. The apparatus of claim 6 wherein the hydraulic or electro-mechanical actuator comprises a ram bracket, mounted to the second mounting plate;

an electrical ram subsystem, mounted to the ram bracket and to the second pivoting spindle, and electrically coupled to an automobile battery.

10. The apparatus of claim 6 wherein the hydraulic or electro-mechanical actuator is a hydraulic pump sub-system connected to the tie rod.

11. A controllable slide car for controllably simulating understeer and oversteer conditions in an automobile with a conventional steering system and conventional wheels having first and second rear wheel mounting assemblies, comprising:

a tie rod connected between the first rear wheel mounting assembly and the second rear wheel mounting assembly;

a first control arm connected between the first rear wheel mounting assembly and a first underside location of the automobile;

a second control arm connected between the second rear wheel mounting assembly and said first underside location of the automobile;

a first torsion bar connected between the first control arm and a second underside location of the automobile;

a second torsion bar connected between the second control arm and a third underside location of the automobile;

an electrical ram subsystem, mechanically connected to the underside of the automobile and the second rear wheel mounting assembly, and electrically coupled to an automobile battery; and a control unit, coupled to the electric ram subsystem and the automobile battery, for controlling the electric ram subsystem and steering the first and second rear wheel mounting assemblies;

whereby movement of the electric ram subsystem causes movement of the rear wheel mounting assemblies and whereby this movement caused by the electric ram subsystem is movement in addition to movement caused by the conventional wheel steering system of the rear wheel mounting assemblies;

and whereby the oversteer and understeer are accomplished through movement of the conventional wheels and are accomplished without the use of additional wheels and without replacing any of the conventional wheels.

* * * * *